United States Patent [19]

Maeda et al.

[11] Patent Number: 5,420,847
[45] Date of Patent: May 30, 1995

[54] REPRODUCING SYSTEM FOR AN OPTICAL DISC

[75] Inventors: Takanori Maeda; Toru Akiyama; Fumitaka Kotaka; Noriaki Murao, all of Saitama, Japan

[73] Assignee: Pioneer Electronic Corporation, Tokyo, Japan

[21] Appl. No.: 69,850

[22] Filed: Jun. 1, 1993

[30] Foreign Application Priority Data

Jun. 2, 1992 [JP] Japan .................. 4-166842

[51] Int. Cl.⁶ .............................. G11B 7/20
[52] U.S. Cl. ...................... 369/111; 369/112; 369/120; 369/44.37; 369/44.41; 250/201.5
[58] Field of Search ........ 369/275.1, 109, 111, 369/112, 120, 121, 44.37, 44.38, 44.41; 250/201.5, 206.1

[56] References Cited

U.S. PATENT DOCUMENTS

| | | | |
|---|---|---|---|
| 4,167,024 | 9/1979 | Hamisch | 358/128 |
| 4,446,545 | 5/1984 | Van Dijk | 369/44.37 |
| 5,168,487 | 12/1992 | Ohsato et al. | 369/44.37 |

FOREIGN PATENT DOCUMENTS

0525896A2 2/1993 European Pat. Off.
2634243 2/1978 Germany.

OTHER PUBLICATIONS

Patent Abstracts of Japan, vol. 10, No. 225 (P-484), Aug. 6, 1986 & JP-A-61 061 236, Mar. 29, 1986.
"Optical Video Disc System for HDTV", Saeki et al, Proceedings of the Third International Workshop on HDTV, Sep. 9, 1989, pp. 519-526.
Patent Abstracts of Japan, vol. 7, No. 253 (P-235), Nov. 10, 1983, & JP-A-58 137 144, Aug. 15, 1983.

*Primary Examiner*—Paul M. Dzierzynski
*Assistant Examiner*—Kiet T. Nguyen
*Attorney, Agent, or Firm*—Nikaido, Marmelstein, Murray & Oram

[57] ABSTRACT

A plurality of tracks are spirally arranged in a group on an optical disc. The tracks in the group are simultaneously radiated by laser beams. Adjacent tracks in the group are disposed at a radial distance d1, and adjacent spots of the laser beams on the tracks are disposed at a radial distance ds which is smaller than the distance d1.

5 Claims, 3 Drawing Sheets

REPRODUCING SYSTEM FOR AN OPTICAL DISC

FIELD OF THE INVENTION

The present invention relates to a reproducing system for an optical disc, a plurality of tracks of which are simultaneously reproduced.

BACKGROUND OF THE INVENTION

There has been proposed an optical disc such as a high-definition videodisc (HDVD) in which a high-definition picture is recorded. Since the HDVD uses a large spectrum space which is four times as much as the conventional NTSC format videodiscs, the video signal is divided into a plurality of components which are retarded in different tracks of the disc. The high-definition video signal is obtained by simultaneously reading each track and synthesizing the signals reproduced from the tracks.

Referring to FIG. 5, the videodisc has a plurality of outwardly spiraling tracks on the recording surface thereof. In the example, the tracks comprises three adjacent tracks 11, 12 and 13. Namely, the track 11 extends to the track designated by references 11a and 11b, after one turn and two turns. Similarly, the tracks 12 and 13 extend to tracks 12a to 13b. The three tracks are simultaneously radiated with beams 4, 5 and 6 So as to be read at the same time. For the. convenience of explanation, it is assumed that the three tracks, are arranged in a group.

The beams 4, 5 and 6 reflected on the tracks are received by three photodetectors, the outputs of which are added to obtain a reproduced RF signal. In the conventional disc player, the distances between the beams 4 and 5, and 5 and 6 in the radial direction of the disc are equal to the distance between the tracks in the radial direction of the disc.

The tracks on the disc can be deviated due to a warp of the disc. In order to properly centralize the laser beams on the tracks, there is provided a track-following servo system where a tracking error signal, which represents the deflections of the beams from the tracks, is obtained from the output signals of one of the photodetectors.

One of the methods for obtaining the tracking error signal is a push-pull method. The push-pull method uses beams split by diffraction.

Referring to FIG. 6, a photodetector 1 for receiving a center beam spot has two detector elements 3a and 3b divided by a center line 2. The beam 5 is diffracted to form a center zeroth-order diffraction beam and, first-order diffraction beams deflected in positive and negative directions from the center zeroth-order diffraction beam.

The center beam and the deflected side beams form an overlapped beam spot on the detector elements 3a and 3b. When the laser beam 5 is properly centralized on the track, the areas of the beam spot on each of the detector elements 3a and 3b are equally distributed. On the other hand, if the tracking is off-center, the reflected beams are asymmetrically diffracted. As a result, the outputs of the detector elements 3a and 3b of the photodetector 1 are different from each other. A track-following servo system is operated to adjust the optical system so that the outputs of the detector elements 3a and 3b become equal to each other. Since the positions of the beams 4 and 6 are set with respect to the center beam 5, when the beam 5 accurately follows the track, so do the beams 4 and 6.

In order to obtain an accurate tracking error signal, the center line 2 defining the detector elements 3a and 3b of the photodetector 1 must be precisely adjusted in the order of microns, at the center of the beam spot. In addition, there is a problem of a DC offset inherent in the push-pull method.

In the push-pull method, an objective of the optical system is moved so as to coincide the center of the laser beam 5 with the track. The spot of the reflected beam formed on the detector elements 3a and 3b is inevitably deflected in the direction perpendicular to the center line 2. Thus, although the size of the overlapped areas on the detector elements 3a and 3b are equal to each other, there is a difference between the outputs thereof due to the difference in the areas. Hence, a DC offset is caused in the tracking error signal. The track-following servo system is operated in accordance with the erroneously offset tracking error signal so that the beams are further deflected from the tracks.

Furthermore the optical disc may be warped so that the optical axes of the laser beams are not perpendicular to the recording surface of the videodisc. The spot on the detector elements 3a and 3b is distorted instead of forming a circle, so that the distribution of energy on the detector elements 3a and 3b differs. Hence, a DC offset is also present in the tracking error signal.

Moreover, when playing an HDVD, the three beams may not be following the right group of tracks, that is, the three tracks being simultaneously read may not belong to the same group. In order to confirm that the correct tracks are read, it is necessary to demodulate the reproduced RF signal, and to determined whether the content of the demodulated RF signal represents a correct signal. The process requires time, which means a delay of starting the reproduction of the disc.

SUMMARY OF THE INVENTION

An object of the present invention is to provide an optical reproduction system wherein the tracks, which are simultaneously read, are easily and quickly confirmed.

According to the present invention, there is provided a reproducing system for an optical disc on which a plurality of tracks are spirally arranged in group and the tracks in the group are simultaneously radiated by laser beams.

Adjacent tracks in the group are disposed at a radial distance d1, and adjacent spots of the laser beams on the tracks are disposed at a radial distance ds which is different from the distance d1.

In an example of the invention the distance ds is smaller than the distance d1.

These and other objects and features of this invention will become understood from the following description with reference to the accompanying drawings.

DETAILED DESCRIPTION OF THE PREFERRED EMBODIMENTS

Figure 1:
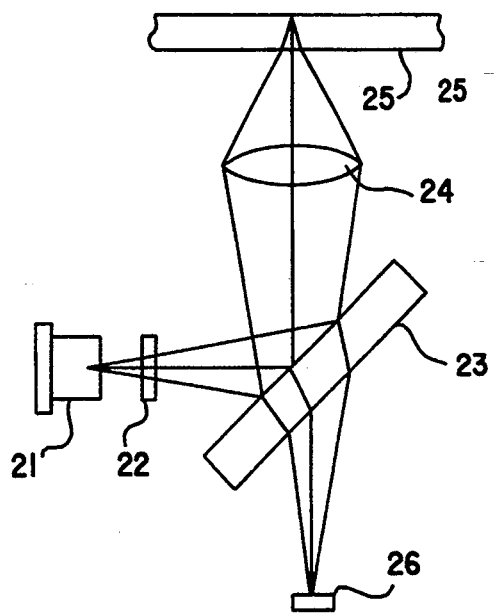
FIG. 1 is a schematic diagram of an optical system of an optical disc player to which the present invention is applied.

Referring to FIG. 1 an optical system provided in a player of an optical disc 25 such as an HDVD has a semiconductor laser device 21 which emits a laser beam. The laser beam is split into three beams by a grating 2 and each beam is focused on a track of the optical disc 25 through a beam splitter 23, and an objective 4. The three beams reflected from the optical disc 25 pass through beam splitter 23 and are received by detecting areas of a photodetector device 26.

Figure 2:
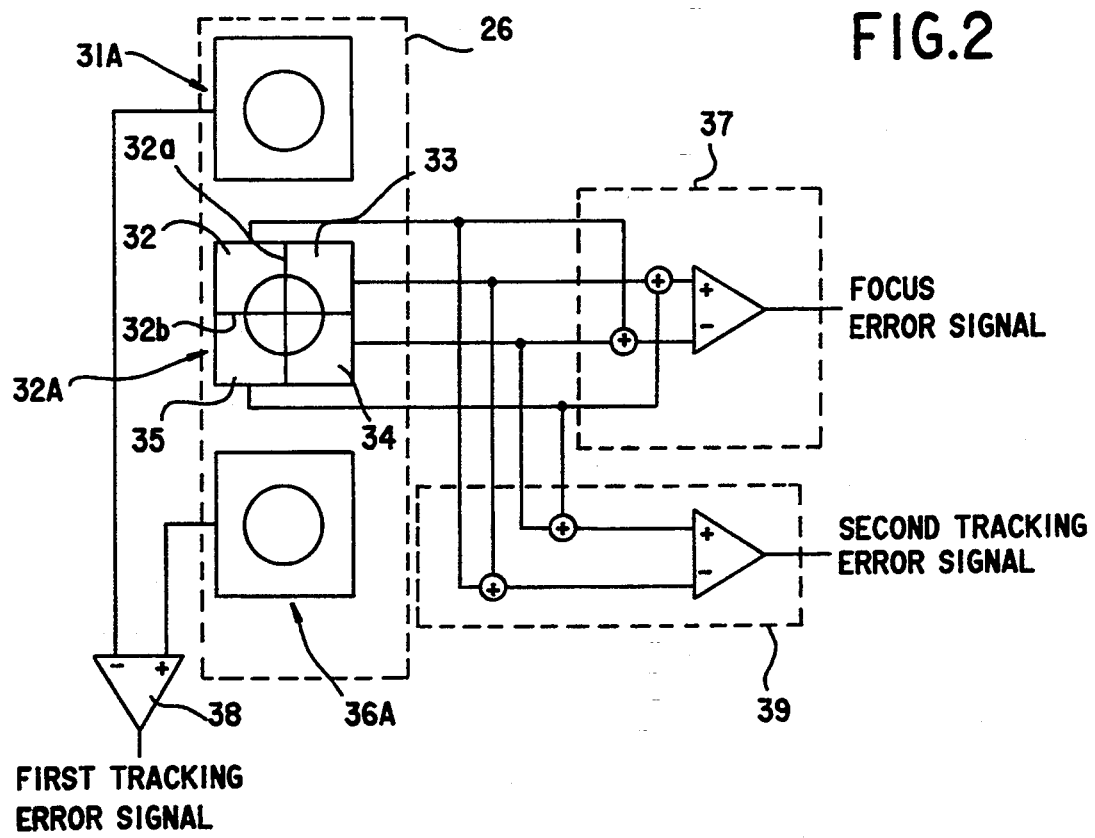
FIG. 2 is a block diagram of a track-following servo system and a focus servo system according to the present invention.

Referring to FIG. 2, the photodetector device 26 comprises three photodetectors 31A, 32A and 36A for deriving a tracking error signal, focus error signal and a reproduced RF signal. Each of the photodetectors 1A, 32A, and 36A detects respective beam spots caused by the beams 401, 402, and 403 (FIG. 3) reflected from the three adjacent tracks.

The center photodetector 32A has four detector elements 32, 33, 34 and 35, which are defined by two crossing center lines 32a and 32b. Each of the outputs of the detector elements 32 to 35 are applied to a focus error calculator 37. The focus error calculator 37 uses an astigmatic method to generate a focus error signal. That is, the difference between sums of the outputs of the diagonal detector elements 32 and 34, and 33 and 35 is obtained.

The outputs of the photodetectors 31A and 36A are applied to a first tracking error calculator 38 comprising an operational amplifier where the difference therebetween is obtained to generate a first tracking error signal for correcting a tracking error.

Outputs of the detector elements 32 to 35 of the photodetector 32A are further applied to a second tracking error calculator 39. The second tracking error calculator 39 uses the push-pull method wherein the difference between the sum of the detector elements 32 and 33 and the sum of the detector elements 34 and 35, which are divided by the center line 32b, is calculated to obtain a second tracking error signal. The first tracking error signal and the second tracking error signal are used to determine that a correct combination of tracks are read.

The RF signal is obtained by adding the outputs of each of the photodetectors 31A, 32A and 36A.

Figure 3:
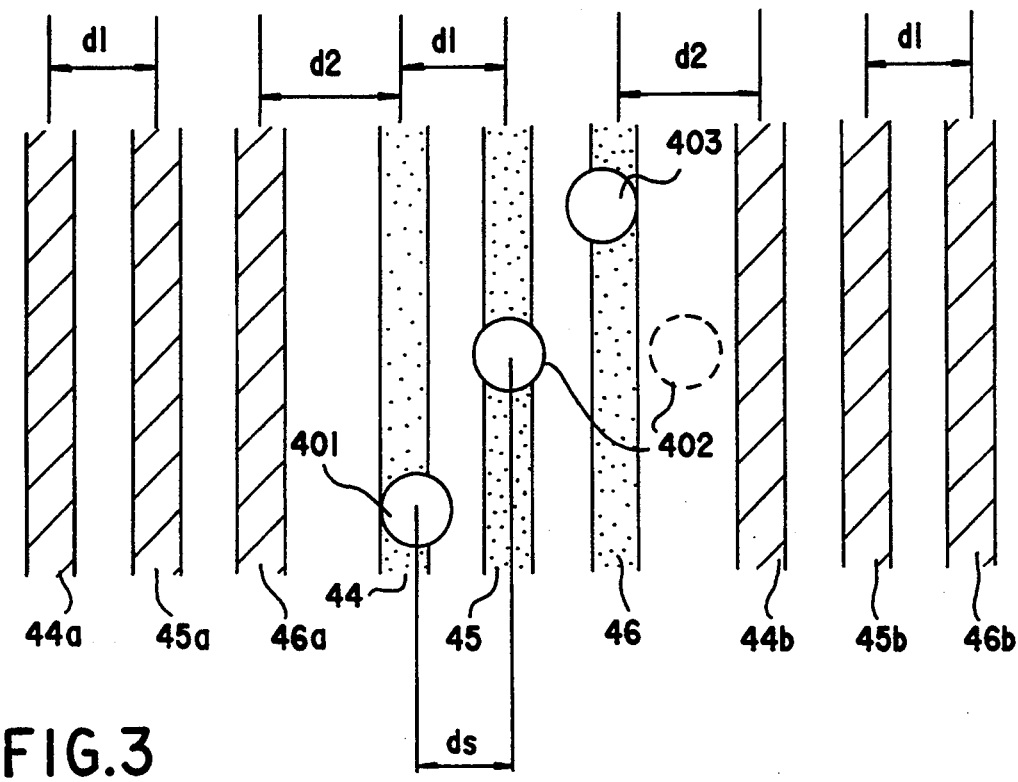
FIG. 3 is a plan view showing a part of an optical disc.

Referring to FIG. 3, the optical disc 25 has a plurality tracks 44 to 46b, spiraling outward from the center of the disc. As is the conventional videodisc, a group of three tracks, namely tracks 44 to 45 is simultaneously read to obtain the RF signal for reproducing a high-definition video signal. More particularly, the tracks, for example, 44, 45 and 46 belonging to the same group are radiated with respective beams 401, 402, and 403 at the same time.

In accordance with the present invention, a radial distance d1 between the adjacent tracks in the same group is shorter than a distance d2 between the adjacent groups (d1<d2).

Each of the radial distance ds among the adjacent spots of beams 401 and 402 and 403 is shorter than the distance d1 between the tracks (ds<d1). Hence, when the central beam 402 correctly follows the central track 45, the side beams 401 and 403 are slightly offset from the tracks 44 and 46, respectively, toward the central track 45.

In operation, the laser beam is emitted from the semiconductor laser device 21 and split into three beams 401, 402 and 403 by the grating 22. The beams are focused on the tracks of the optical disc 25 through the objective 24, thereby forming spots on the disc. The reflected beams are applied to the photodetector device 26 which are adjusted to receive each beam on the respective areas of the photodetectors 31A, 32A and 36A.

The reflected center beam 402 is received by the photodetector 32A so that the focus error signal is generated by the focus error calculator 37. The focus servo system is operated in accordance with the focus error signal to render the signal zero.

In order to generate the tracking error signal, upon which the beams are controlled to accurately follow the tracks, the outputs of the photodetectors 31A and 36A receiving the side reflected beams 401 and 403 are applied to the first tracking error calculator 38. Since the distance ds between the beams is smaller than the distance d1 between tracks in the group, the beams 401 and 403 are slightly offset to the central beam 402 from the respective tracks. Accordingly, when there is an error in tracking, the output of one of the photodetectors 31A and 36A becomes smaller than the output of the other. Thus, the operational amplifier 38 produces the first tracking error signal dependent on the difference. The track-following servo system is accordingly operated to correct the error. Since two beams of opposite side photodetectors 31A and 36A are used together with the push-pull method in the central photodetector 32A, the DC offset can be cancelled by the first tracking error signal.

Due to the offset of the side beams 401 and 403 to the central beam 402 the level of the reproduced RF signal represented by the sum of the outputs of all photodetectors 31A, 32A and 36A is smaller than that of a conventional system where there is no offset of the side beams.

In order to prevent excessive deterioration of the reproduced RF signal, experiments for the amount of the offset (difference) was conducted. Detailed calculations have shown that a maximum level of the first tracking error signal was obtained when $$ds = 0.75 \cdot d1$$

If the level of the tracking error signal is within 30% of the maximum level, the reduction rate of the reproduced RF signal is only about 1.2%.

More specifically, the distances ds and d1 are determined in accordance with the following equation.

$$0.5 \cdot d1 < ds < d1$$

In order to prevent crosstalk from adjacent tracks, thereby improving the quality of the RF signal, the distance ds is preferably set as follows:

$$0.75 \cdot d1 < ds < d1$$

If the distance ds is thus set, the tracking error signal can be obtained without deteriorating the RF signal.

In order to determine whether the correct tracks are traced by the beams, the first and second tracking error signals are compared with each other. When the correct tracks are traced, both tracking error signals are zeros. If the beams 401, 402 and 403 radiate tracks which do not belong to the same group, since one of the distances between the tracks is larger than the other, the first and second tracking error signals do not become zero at the same time. Thus, the correct combination of the tracks can be instantaneously confirmed during a track searching operation.

Figure 4:
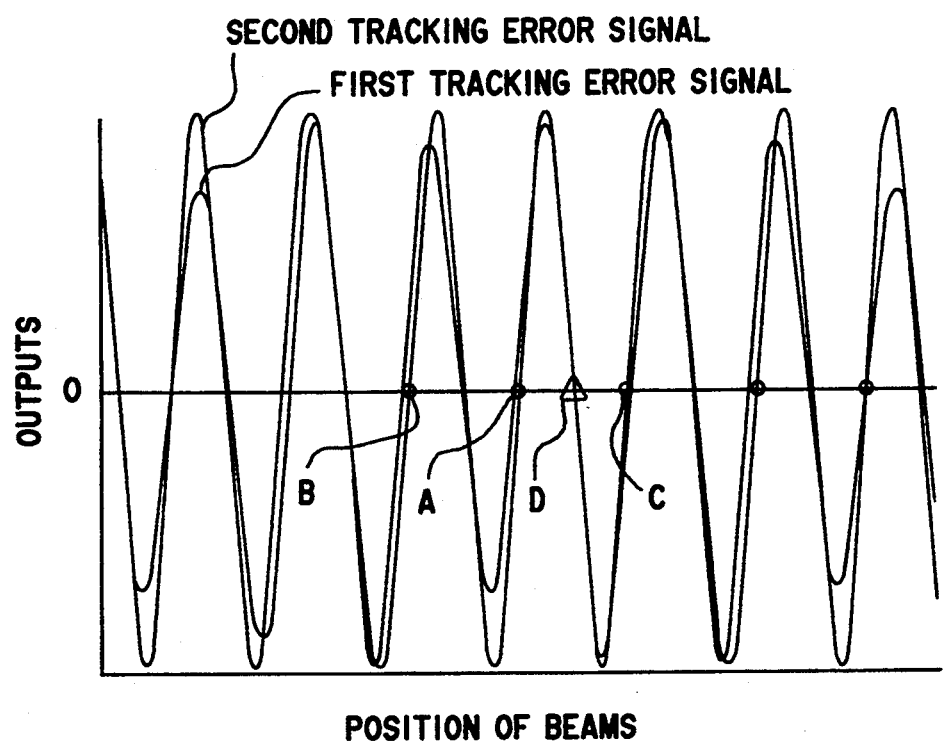
FIG. 4 is a graph showing the characteristics of a first and a second tracking error signals.
Figure 5:
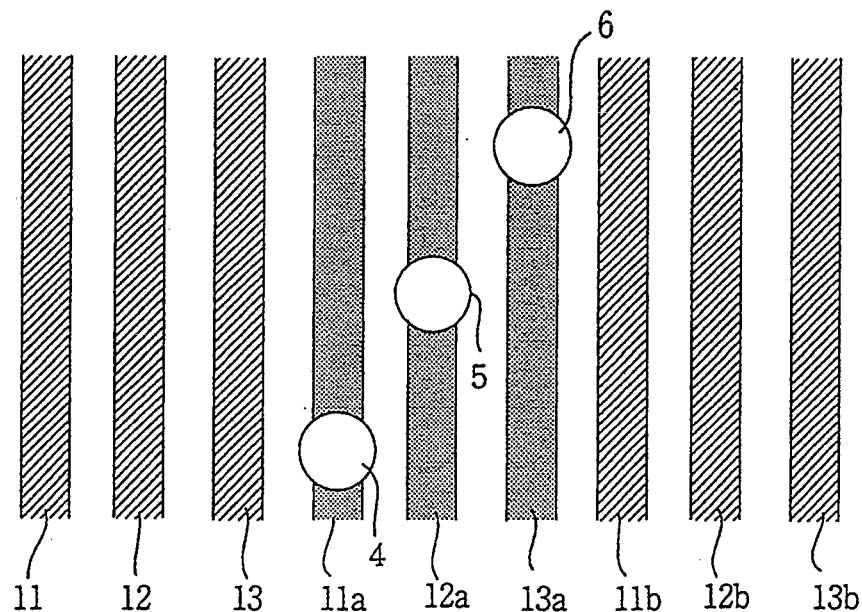
FIG. 5 is a plan view showing a part of a conventional optical disc.
Figure 6:
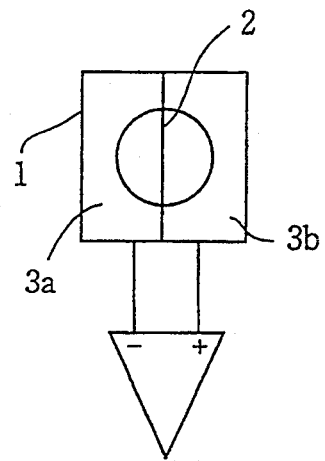
FIG. 6 is a block diagram of a conventional track-following servo system.

The track searching operation is described more in detail with reference to FIG. 4. Suppose that the central beam 402 is radiated on the track 44, that is, the beam 403 is on the track 45 and the beam 401 is on the track 46a which belongs to the adjacent group. When the second tracking error signal is zero as shown by B in FIG. 4, the first tracking error signal is a positive value as shown. As shown at a point C, when the central beam is focused on the track 46, the first tracking error signal is negative when the second tracking error signal is zero.

If the central beam 402 is correctly focused on the track 45,, which is the central track of a particular group of tracks, both of the first and second tracking error signals are zero as shown at a point A.

However, when the central beam 402 is in a space between the adjacent groups as shown by a dotted-dash line in FIG. 3, both error signals become zero as shown at a point D. In such a case, output signals of the photodetectors 31A and 36A become excessively large. Therefore, by comparing the output signals with a reference value, such an erroneous tracking can be detected.

Since the reproduced RF signal no longer needs to be demodulated and its content confirmed, the track searching operation, such as when jumping a plurality of tracks to reach a desired tracks, can be quickly completed.

The present invention may be modified to set the distance ds between the beams larger than the distance d1 between the tracks as follows.

$$d1 < ds < 1.5 \cdot d1$$

In addition, the distance d2 between the tracks of different groups may be smaller than the distance d1 between the tracks of the same group.

Although the second tracking error signal is obtained by the one-beam push-pull method in the embodiment described above, other methods using one beam such as the time difference method and the heterodyne method may be employed. The focus error signal may be generated by the knife edge method, Foucault prism method or the critical angle method.

Three laser devices may be provided in the optical system instead of splitting the laser beam by the grating 22. Alternatively, a prism may be used to split the laser beam.

Moreover, the optical discs to which the present invention is applied are not confined to those such as an HDVD where a plurality of tracks must be simultaneously read to obtain a complete video signal. Namely, adjacent tracks on the disc may store data irrespective of one another, whereby the transmission rate of the data may be improved by simultaneously reading a plurality of tracks.

The present invention may be adapted for playing various optical recording medium such as a read-only disc having a plurality of pits, a rewritable disc wherein reflectance is controlled to rewrite data, and a magneto-optical writable disc. The recording medium may even be an optical card, in which case focusing operation becomes unnecessary.

In accordance with the present invention, an accurate tracking error signal is obtained from the two of the three beams which are simultaneously radiated on the disc to produce an RF signal. Although the two beams are offset from the respective tracks, the offset is within a permissable range so that deterioration of the RF signal is not caused.

In addition, by referring to the first and the second tracking error signals, it is possible to quickly determine whether the three beams are tracing the tracks in the same group. Hence a quick track searching operation can be performed.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A reproducing system for an optical disc on which a plurality of tracks are spirally arranged in a group and the tracks in the group are simultaneously radiated by laser beam spots from a laser source, comprising:

adjacent tracks in the group are disposed at a radial distance d1;

adjacent spots of the laser beam spots on the tracks are disposed at a radial distance ds which is different from the distance d1;

central photodetector means for receiving a central beam spot of the laser beam spots reflected from a central track in said group and for producing second tracking signals dependent on a position of the central beam spot on the central track;

outside photodetector means for receiving outside beam spots of the laser beam spots reflected from outside tracks in said group and for producing first tracking signals dependent on positions of the outside beam spots on the outside tracks;

first tracking error calculator means for producing a first tracking error signal from the first tracking signals; and second tracking error calculator means for producing a second tracking error signal from the second tracking signals.

2. The system according to claim 1 wherein the distance ds is smaller than the distance d1.

3. The system according to claim 1 wherein the distances d1 and ds have the following relationship $$0.5 \, d1 < ds < d1$$

4. The system according to claim 1 wherein the distances d1 and ds have the following relationship $$d1 < ds < 1.5 \, d1$$

5. The system according to claim 1 wherein adjacent groups of the tracks are disposed at a radial distance d2 which is different from the distance d1 and the distance ds.

* * * * *